May 23, 1972   HANS-WERNER SICKEL   3,664,695
TURNING BOLT LOCKING DEVICE FOR TRANSPORT VEHICLES
Filed Nov. 18, 1970   2 Sheets-Sheet 1

Inventor:
HANS-WERNER SICKEL
BY Cushman, Darby & Cushman
ATTORNEY

May 23, 1972    HANS-WERNER SICKEL    3,664,695
TURNING BOLT LOCKING DEVICE FOR TRANSPORT VEHICLES
Filed Nov. 18, 1970      2 Sheets-Sheet 2
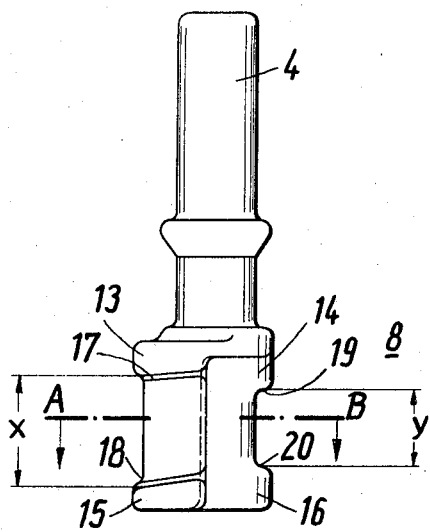
Fig. 2
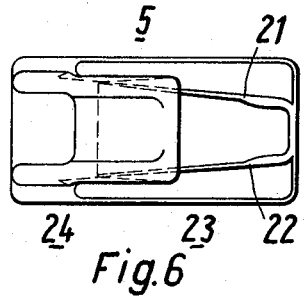
Fig. 6
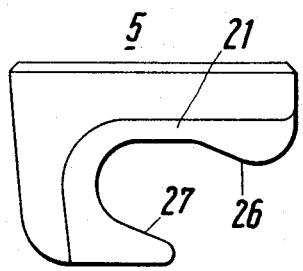
Fig. 5
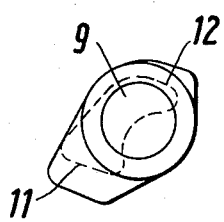
Fig. 3
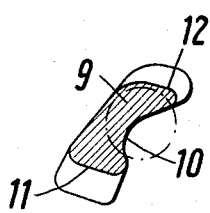
Fig. 4 (A-B)
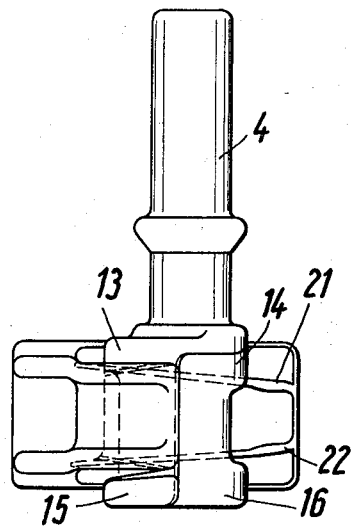
Fig. 7
Inventor:
HANS-WERNER SICKEL
BY Cushman Darby & Cushman
ATTORNEYS United States Patent Office 3,664,695
Patented May 23, 1972

3,664,695
TURNING BOLT LOCKING DEVICE FOR
TRANSPORT VEHICLES
Hans-Werner Sickel, Hagen, Germany, assignor to Firma
F. Hesterberg & Sohne, Westphalia, Germany
Filed Nov. 18, 1970, Ser. No. 90,715
Claims priority, application Germany, Dec. 3, 1969,
P 19 60 697.4
Int. Cl. E05c 3/04, 7/02
U.S. Cl. 292—54
3 Claims

ABSTRACT OF THE DISCLOSURE

A turning bolt locking device for transport containers comprising a bolt provided at each end with eccentrically offset locking elements which during the locking turning movement tighteningly engage receivers affixed to the container frame, the locking element comprising an angularly recessed cylindrical body axially of the bolt and integrally formed with locking surfaces both at its upper and bottoms ends in the form at each such end of two cams of which the inside locking surfaces have a screw pitch, the axial distance between the cams corresponding to the axial distance between co-operating surfaces forming a corresponding screw thread in the receiver. The locking element may have surfaces that extend parallel in the axial direction and in the locking position make thrust transmitting contact with corresponding flat surfaces in the receiver.

Figure 1:
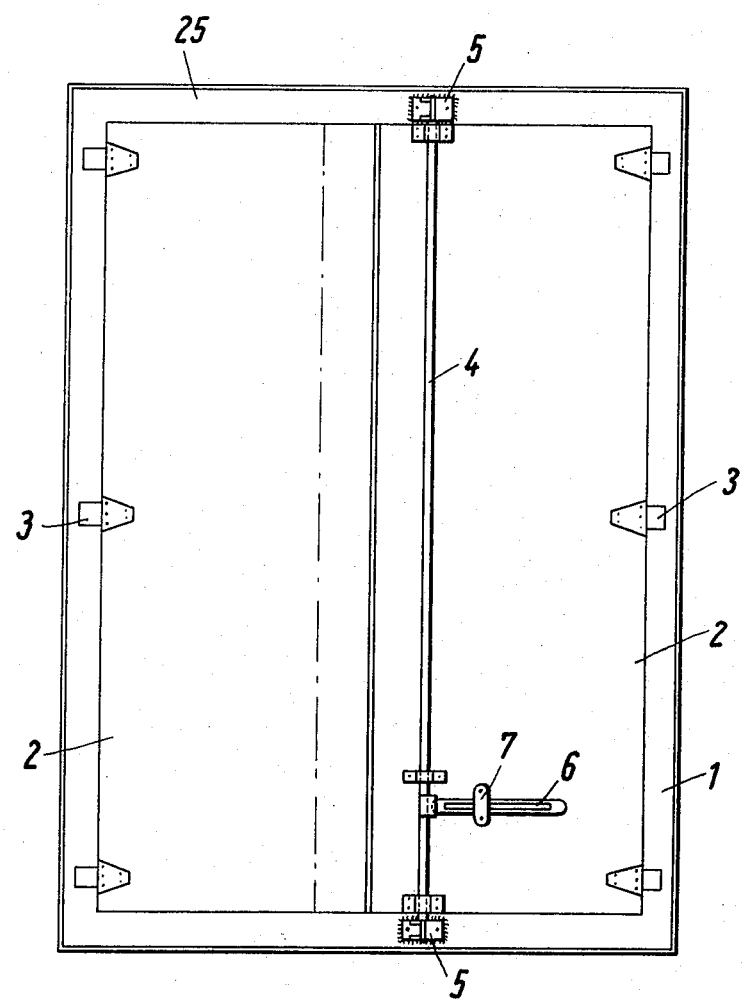

The invention relates to a turning bolt locking device for transport containers, particularly of the kind used for container traffic. The bolts of such locking devices are provided at each end with eccentric locking elements which by virtue of the turning movement of the bolt during the locking action tighteningly engage receivers affixed to the container frame.

One known turning bolt locking device of this kind is formed with an eccentrically offset cylindrical locking pin and bounding surfaces that in locking position are intended to make contact with horizontal surfaces of the receiver. The cylindrical shape of the locking pin prevents flush contact of the pin with the surface of the receiver. Nor do the bounding surfaces cooperating with the receiver generate a tightening pull in the axial direction of the bolt. This means that in locking position the locking device has no bracing action on the container frame in the sense of increasing its resistance to distorting loads. Moreover, a detachable container roof or cover could not be safely retained. Another locking device known in the art comprises twin cams as tightening elements. These have the drawback that they can have some bracing effect only in closed frames but not when the cover or roof of the container is detachable.

For safely holding the detachable roof or cover conventional locking devices must be duplicated on each door and the locking elements must be differently designed to have a tightening action in two relatively perpendicular directions. This is a drawback from the production and stockkeeping points of view and increases the cost. Moreover, the several locking devices must be simultaneously operated because otherwise locking cannot be accomplished or at least it can be done only with difficulty.

In order to avoid bending the locking element it has been proposed to enlarge the locking pin at its base. This results in the creation of clearance between the pin and the wall of the receiver in locking position and a consequent undesirable, more or less considerable degree of distortion of the container frame.

It is the object of the present invention to eliminate these drawbacks and to provide a turning bolt locking device which, besides having a satisfactory pull-tight action, is capable of locking the doors reliably and of tightening them in two relatively perpendicular directions and at the same time of gripping and holding a detachable cover or roof. Moreover, if necessary for reasons of stability, it is intended that it should be possible to fit two turning bolt locking devices of identical design to one door in such a way that they can be operated the one after the other.

According to the invention this object is achieved by providing a locking element in the form of an angularly recessed cylindrical body centrically attached to the bolt and integrally formed with an eccentrically offset part having the locking surfaces. At both its upper and bottom ends the eccentric part is provided with two cams of which the inside locking surfaces have a screw pitch, the axial distance between the cams corresponding to the axial distance between cooperating surfaces that form a corresponding screw thread in the receiver.

Hence the turning of the bolt for closing results in the locking elements entering the receivers with a kind of screw action. This action has a self-locking tightening effect in the direction of the bolt axis as well as radially thereto.

Conveniently the locking element may be provided with flat surfaces extending axially in parallel for thrust transmitting contacting cooperation with corresponding flat surfaces in the receiver. This provides an additional bracing effect against distortion of the frame. The result is a turning bolt locking device which is highly satisfactory for fulfilling the requirement of such a locking device.

A preferred embodiment of the invention is shown in the drawing

FIG. 1 is a rear view of a container, showing the frame and two doors,
FIG. 2 is a rear view of the tightening element,
FIG. 3 is a view from above and
FIG. 4 is a section taken on the line A—B in FIG. 2;
FIG. 5 is a view from above and
FIG. 6 is a side view of a receiver.
FIG. 7 is a view of the locking element after this has been turned into engagement with the receiver.

With reference to FIG. 1 the frame 1 of a container, particularly of the kind used for container traffic, carries a pair of doors 2 hung on hinges 3. For locking the doors 2 and at the same time for improving the racking strength of the frame, turning bolts are provided of which only the bolt fitted to the right hand door is shown at 4. In the drawing the locking elements are shown after they have been rotated into full engagement with the cooperating receivers 5, i.e., in locked position. Closing and opening is accomplished by operating a hand lever 6. A retainer 7 may be provided for this lever.

The locking element 8 comprises a cylindrical body 9 attached to the end of the bolt 4. This body is angularly recessed at 10, the vertex of the angle being preferably rounded as shown in FIG. 4. Moreover, integrally formed with the cylindrical body 9 is an off-centre portion having tightening locking faces 11 and 12. At both the top and bottom ends of the locking element 8 two cams 13 and 14 respectively 15 and 16 project. The tightening faces 17 and 18 on the inside have a helical pitch and the same also applies to the tightening faces 19 and 20. The axial distances $x$ between the cams 13 and 15 and $y$ between the cams 14 and 16 correspond to the axial distance between the cooperating surfaces 21 and 22 of the fixed receiver 5 at 23 and 24 respectively (FIGS. 5 and 6). The resultant arrangement is therefore such that the locking element 8 is adapted to turn itself like a screw into the nut-like cooperating receiver 5. This screw-like engagement results in a locking action creating tensile stress in the locking elements axially of the turning bolt 4. This permits a removable cover of the container 1, as might be provided at 25 (FIG. 1), to be gripped and tightly held.

As shown in the described embodiment (FIG. 5) the receiver may be provided with parallel flat surfaces 26 and 27 for cooperation with the corresponding flat surfaces 12 respectively 11 on the locking element 8. These contacting surfaces reduce the distorting effects caused by contradirectional thrust.

The locked position shown in FIG. 7 thus provides the maximum protection against distortion in any direction.

The recess 10 in the cylindrical body 9 permits the locking element 8 to engage the receiver 5 immediately the closing movement begins, so that a good pull-tight action is assured.

Locking can even be accomplished when one door is fitted with two turning bolt locks of the same design without these bolts having to be operated at the same time. This would be a complicated procedure calling for considerable effort.

What is claimed is:

1. A rotatable locking bolt device for securing parts of a transport container, comprising a bolt rotatable about its own axis and provided at each end with a locking element; elements for receiving and co-operating with said locking elements and rotatably supporting the bolt; each said locking element comprising an angularly recessed body portion carried eccentrically by the bolt in relation to the axis thereof; said body portion being formed at its upper end with two oppositely arranged cams and at its lower end with two oppositely arranged cams each said cam having a locking face of screw-surface form and each said receiving element having at least one surface of screw form to co-operate with said cam surfaces at the upper end of the said body portion of the locking element and at least one surface of screw formation to co-operate with the cam surfaces at the lower end of the said body portion of the locking element such that by turning the bolt the locking elements and the receiving elements can be brought into tight engagement and the device securely fastened.

2. A rotatable bolt locking device according to claim 1, in which the said body portion of each said locking element has surfaces that extend in parallel in the axial direction of the bolt, and each receiving element has corresponding flat surfaces against which the said flat surfaces of the locking element thrust when the bolt is turned to locking position.

3. A rotatable locking bolt device for securing a door of a transport container, comprising a bolt rotatable about its own axis and provided at each end with a locking element, elements for receiving and co-operating with said locking elements, each said locking element comprising a body portion carried eccentrically by the bolt in relation to the axis thereof; said body portion having both at its upper end and at its lower end two oppositely arranged cams each providing a locking face of screw-surface form and each said receiving element having at least one surface of screw form to co-operate with said cam surfaces at the upper end of said body portion and at least one surface of screw formation to co-operate with the cam surfaces at the lower end of the said body portion; said body portion and said receiver having co-operating camming means operative perpendicular to the axis of the bolt so that by turning the bolt tightening forces are exerted in the axial direction of the bolt as well as radially thereof without lateral distortion of the door.

References Cited

UNITED STATES PATENTS

| 3,484,127 | 12/1969 | Pastua | 292—218 |
| 3,147,031 | 9/1964 | Olander | 292—340 |
| 2,451,537 | 10/1948 | Dath | 292—218 |
| 2,538,203 | 1/1951 | Lehman | 292—218 |
| 3,544,145 | 12/1970 | Cerutt | 292—54 |

FOREIGN PATENTS

| 470,542 | 1/1951 | Canada | 292—218 |

ROBERT L. WOLFE, Primary Examiner

U.S. Cl. X.R.

292—241, 340, Dig. 32